INVENTORS
EDWARD P BULLARD III
FRANK H. MUSSLER
LEROY E. ALVEY
BY
ATTORNEY

June 20, 1944.　　E. P. BULLARD, 3D., ET AL　　2,351,921

MACHINE TOOL

Filed July 16, 1940　　8 Sheets-Sheet 7

INVENTORS
EDWARD P. BULLARD III
FRANK H. MUSSLER
BY　LEROY E. ALVEY
Paul M. Gist
ATTORNEY Patented June 20, 1944

2,351,921

UNITED STATES PATENT OFFICE 2,351,921

MACHINE TOOL

Edward P. Bullard, III, Fairfield, Leroy E. Alvey, Bridgeport, and Frank H. Mussler, Stratford, Conn., assignors to The Bullard Company, a corporation of Connecticut Application July 16, 1940, Serial No. 345,773

35 Claims. (Cl. 82—5)

This invention relates to machine tools of the type that includes a tool head movable along intersecting paths by a transmission, and particularly to a single attachment adapted to be connected to the transmission for modifying the movement of the tool head along its paths of movement to render the machine tool capable of performing a multiplicity of functions that heretofore required a separate attachment for each function.

While the principles of the invention may be applied to any machine tool in which a member is moved along intersecting paths by a transmission, they will be described in connection with a vertical turret lathe.

Machine tools of the lathe, or boring mill types are adapted to machine cylindrical objects primarily. However, many additional functions are required of such machines including, among others, performing angular turning, cutting English and metric threads, performing English and metric drum scoring and cutting English and metric scrolls. Prior known machines of this type employ separate attachments for each of these functions and require extensive re-arrangement and adjustment of the machine before each of the functions can be performed.

An object of this invention is to provide a unitary attachment adapted to be connected to the feed-works transmission of a machine tool that will perform all of the above recited functions and require only minor changes in the attachment for each separate function.

Other objects of the invention include the provision of a machine tool having a tool head movable along intersecting paths under the influence of a feed-works transmission and an attachment cooperable with the transmission to effect movement of the tool head along any line in a single plane and throughout substantially 360°; the provision of an attachment for such a machine tool in which a change-gear train is provided that may be selectively connected to the means that moves the tool head along either of its intersecting paths, while the means that moves the head along its other path may be controlled directly by the feed-works transmission; the provision of such an attachment in which the gear train includes a pivotal arm and means for providing different axes for a plurality of change gears; and the provision of a lathe and an unitary attachment therefor capable of producing angular turning throughout substantially 360°; cutting English and metric threads; producing English and metric drum scoring; and cutting English and metric scrolls.

The above, other objects and novel features of the invention will become apparent from a consideration of the following specification and the accompanying drawings, in which.

Figure 1:
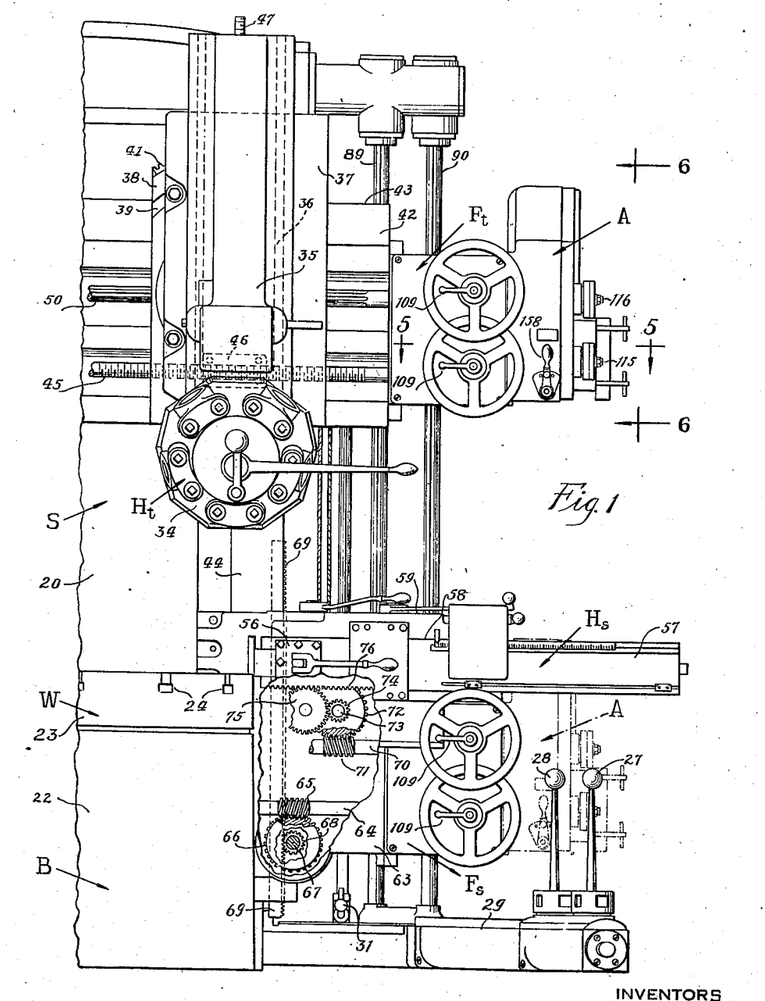
Figure 1 is a front elevational view of part of a vertical turret lathe to which the principles of this invention have been applied.
Figure 2:
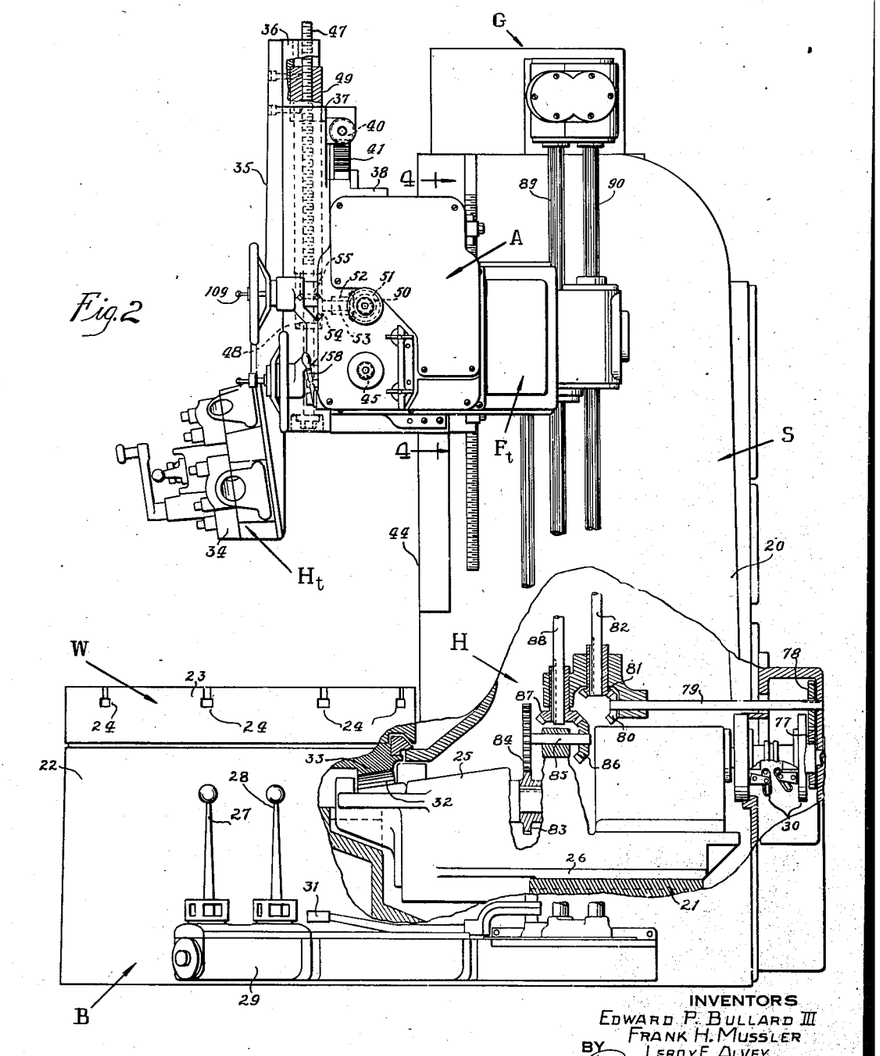
Fig. 2 is a side elevational view of the vertical turret lathe shown in Fig. 1, certain parts having been removed and others broken away to show the head-stock transmission of the lathe.
Figure 3:
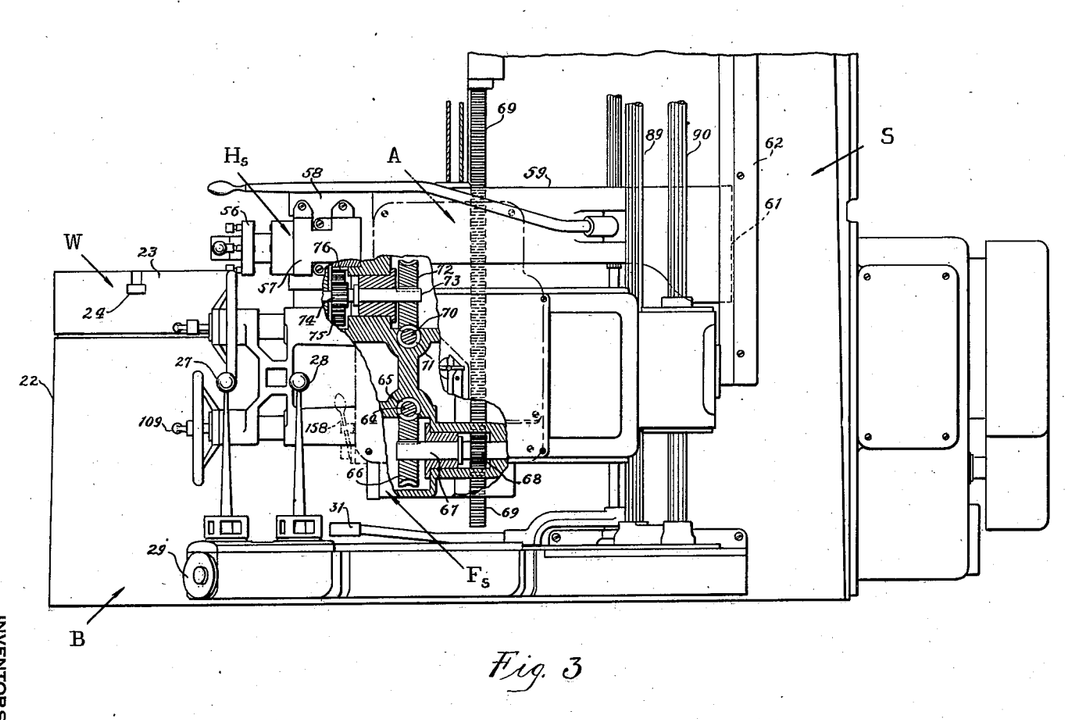
Fig. 3 is a side elevational view of part of the lathe shown in Figs. 1 and 2 in which the parts removed from Fig. 2 are disclosed, and other parts are broken away to show certain features of the machine.

Referring to the drawings and particularly Figs. 1, 2 and 3, the invention is shown as applied to a vertical turret lathe including a standard S to the bottom of which is integrally joined a base B. A work-supporting table W is mounted on the top of the base B and is provided with a vertical spindle journaled in bearings therein. A headstock transmission H, within standard S, receives its power from a motor (not shown) and drives the rotatable work-supporting table W at a plurality of speeds. A turret head $H_t$ adapted to hold a plurality of tools for operating on the work, is supported at the front of the standard S for reciprocation along intersecting paths. A feed-works transmission $F_t$ is supported in operative relation with respect to the turret head $H_t$ and is adapted to provide the power necessary to move said turret along its intersecting paths at a plurality of speeds for feeding a tool during a machining operation, and to move said turret at a substantially constant, relatively rapid speed for moving a tool into and out of operating position relative to the work on the table W.

A side head Hs is mounted on the standard S for substantially vertical and horizontal reciprocation relative to the table W. The side head Hs has a feed-works transmission Fs associated with it to provide the power necessary to move said side head along its horizontal and vertical paths in the same manner as the feed-works Ft moves the turret head Ht along its intersecting paths. The feed-works transmissions Ft and Fs are identical and interchangeable. The power for driving the feed-works transmission Ft and Fs is supplied from the headstock transmission H through suitable gearing and shafting that pass through a gear bracket G located on the top of the standard S, thence outwardly and downwardly into said feed-works transmissions.

The feed-works Fs and Ft control the movement of the heads Hs and Ht respectively along their paths of movement individually or together. When either of the feed-works is employed to move its corresponding head simultaneously along both its paths of movement, the resultant travel of said head will be along a line that bisects the angle between the paths of movement of said head. The transmissions Ft and Fs are designed primarily to control the movement of the heads Ht and Hs during machining operations in which cylindrical objects are turned. When it is desired to perform additional functions with the lathe e. g., performing angular turning, cutting English and metric threads, producing English and metric drum scoring and cutting English and metric scrolls, the motion of the heads Ht and Hs must be modified to accomplish the additional functions. Accordingly, an attachment A is adapted to be connected to the feed-works Ft and/or Fs. The attachment A includes a change-gear train adapted to modify the movement of the heads Ht and Hs along either of their paths of motion, but not along both of their paths of motion at the same time. The attachment A may be employed with the feed-works Ft such that the former will control the movement of the head Ht along one of its paths of motion while the latter controls the movement of the head Ht along its other path of movement. Furthermore, the change-gear train of the attachment A is adapted to cover a wide range of operations and enables the lathe to accomplish many additional functions.

Referring to Figs. 1 and 2, the standard S comprises a substantially hollow casting 20 having bearings 21 along opposite inner walls for supporting the headstock transmission H. The base B comprises a substantially cylindrical hollow portion 22 cast integrally with the lower portion of the standard S. The work-supporting table W comprises a circular disc 23 provided with radially-disposed grooves 24 within which chucking members are adapted to be mounted for engaging the work.

The headstock transmission H comprises a housing 25 having bearing portions 26 on each side thereof that engage the bearings 21 within the standard S. The transmission H forms no part of the present invention. It is fully described and claimed in co-pending application, Serial No. 306,122 filed November 25, 1939, in the name of Edward P. Bullard, III, et al. The transmission H, therefore, will be described only insofar as it is necessary to show its relation with respect to certain features of the present invention. Various gear combinations within the transmission H are adapted to be engaged by the operation of gear shifting levers 27 and 28 mounted on the forward end of a gear shifting bracket 29. When a pre-selected gear combination is engaged, a combined brake and clutch 30 is adapted to be shifted to disengage the brake and engage the clutch by one of a plurality of shift levers 31. The transmission H is adapted to drive, at a plurality of different speeds, a bevel gear 32 which meshes with a bevel ring-gear 33 fixed to the under surface of the work-supporting table W.

The tool-supporting turret head Ht comprises a turret member 34 rotatably mounted on a pin fixed to the lower end of a turret slide 35 adapted to be reciprocated in guide bearings 36 formed on the sides of a swivel 37. The swivel 37 is mounted on a saddle 38 having an arcuate bearing groove 39 within which a connecting element of the swivel 37 is adapted to fit. Limited oscillatable movement of the swivel 37 may be attained by rotating a worm 40 (Fig. 2) that meshes with an arcuate rack 41 on the saddle 38. The saddle 38 is supported on a slide bearing 42 on a cross-rail 43. The cross rail 43 is mounted for vertical reciprocation along guide bearings 44 formed on each side of the standard S.

The turret head Ht is moved horizontally along the slide bearing 42 on the cross-rail 43 by a horizontally disposed screw 45 threaded into a boss 46 on the back of the saddle 38. Reciprocation of the turret head Ht along the bearings 36 is effected by the rotation of a screw 47 (Fig. 2) journaled in a bearing 48 in the lower portion of the swivel 37. The screw 47 is threaded into an internally threaded boss 49 fixed to the back, and near the top of the slide 35. The rotative movement of the screw 47 is derived from a rotatable shaft 50 to which is splined a bevel gear 51 (Fig. 2). The bevel gear 51 meshes with a bevel gear 52 fixed to one end of a stub shaft 53 journaled in the swivel 37 at the center of the arcuate bearing 39 and located at right angles to the splined shaft 50. The opposite end of the stub shaft 53 is provided with an additional bevel gear 54 that meshes with a bevel gear 55 fixed to the screw 47. Accordingly, rotation of the screw 45 will effect movement of the head Ht horizontally and the rotation of the splined shaft 50 will cause reciprocation of the head Ht within bearings 36.

Referring to Figs. 1 and 3, the side head Hs comprises a tool support 56 pivotally mounted on the forward end of a slide 57 that is adapted to be reciprocated horizontally within guide bearings 58 formed on the front surface of a table 59. The table 59 supports the transmission Fs and is provided with bearing surfaces adapted to cooperate with the lower end of ways 44 formed on the one corner of the standard S, and with a rearwardly extending portion having a tongue bearing 61 adapted to cooperate with a vertically disposed bearing guide 62 fixed to the side of the standard S. The table 59 is adapted to be moved vertically along the bearings 44 and 62 while the slide 57 is adapted to be moved horizontally within the bearings 58. The power from the transmission Fs is transmitted through suitable gearing and racks that control the movement of table 59 and slide 57. Accordingly, a transmission box 63 is mounted on the under surface of the table 59 adjacent the feed-works Fs. The box 63 supports a horizontally disposed shaft 64 on which a worm 65 is fixed and which is adapted to mesh with a worm wheel 66 keyed to a stub shaft 67 (Fig. 3). The stub shaft 67 fixedly supports a spur gear 68 that is adapted to mesh with a vertically disposed rack 69 fixed to the side of the standard S. Accordingly, rotation of the shaft 64 will cause vertical reciprocation of the table 59 and the feed-works transmission Fs. The transmission box 63 likewise includes a horizontally disposed shaft 70 to which is fixed a worm 71 that meshes with a worm gear 72. The worm gear 72 is fixed to a stub shaft 73 (Fig. 3) which latter fixedly supports a spur gear 74. The spur gear 74 meshes with an additional spur gear 75 that is in mesh with a rack 76 located on the under surface of the slide 57. Accordingly, rotation of the shaft 70 causes the slide 57 and the tool head 56 to reciprocate horizontally. The shafts 64 and 70 are spaced apart the same distance as the shafts 45 and 50 are spaced so that the feed-works Fs and Ft may be identical and interchangeable.

The feed-works transmissions Ft and Fs are adapted to move the tool heads Ht and Hs along their respective paths at a plurality of relatively slow rates of speed during a working operation and at a substantially constant relatively rapid rate of speed for moving the heads into and out of operating position relative to work on the table W. Accordingly, two separate sources of power are supplied to the transmissions Ft and Fs from the headstock transmission H. Referring to Fig. 2, the transmission H is provided with a driving gear 77 fixed to its driving shaft at the power input side of the transmission adjacent the combined clutch and brake 30. The gear 77, therefore, rotates at a constant speed irrespective of the speed at which the transmission H drives the work-supporting table W. The driving gear 77 meshes with a spur gear 78 fixed to a horizontally disposed shaft 79. The opposite end of shaft 79 fixedly supports a bevel pinion 80 that meshes with a bevel pinion 81 keyed to a vertically disposed shaft 82. An additional driving gear 83 is fixed to the driven shaft of the transmission H adjacent the power output side thereof. Accordingly, the driving gear 83 is adapted to be rotated by the transmission H at a speed directly related to the speed at which the work table W is driven. The driving gear 83 meshes with a spur gear 84 that is fixed to a stub shaft 85. The end of shaft 85 opposite that which supports gear 84 has keyed thereto a bevel pinion 86 that meshes with a bevel pinion 87 fixed to the lower end of a vertically disposed shaft 88. The vertically disposed shafts 82 and 88 are located directly above the transmission H and approximately at the center of the standard S. These shafts extend vertically upwardly through the top of the standard S into the center gear bracket G. The shafts 82 and 88 are connected, through suitable shafting and gearing, to a pair of vertically disposed driving shafts 89 and 90 located on the outside of standard A, all as more fully described in co-pending application, Serial No. 299,134 filed October 12, 1939, in the name of Edward P. Bullard, III.

In as much as the feed-works transmissions Ft and Fs are identical as well as the attachments A for each of said feed-works, only the feed-works Ft and its associated attachment A will be described in detail. Furthermore, since the feed-works transmission Ft forms no part of the present invention, it will only be described insofar as it is necessary to disclose its relation with respect to the attachment A. The specific details of the feed-works transmission Ft are fully disclosed and claimed in the above referred to co-pending application, Serial No. 299,134.

Referring to Fig. 2, the vertically disposed driving shafts 89 and 90 are splined throughout substantially their entire length so that they will transmit rotative power to the feed-works Ft and Fs even when said feed-works are moved vertically along said shafts. The vertically disposed shaft 90 rotates at a substantially constant relatively fast speed whereas the shaft 89 is adapted to be rotated in a definite relation with respect to the rotation of the work-supporting table W.

Figure 4:
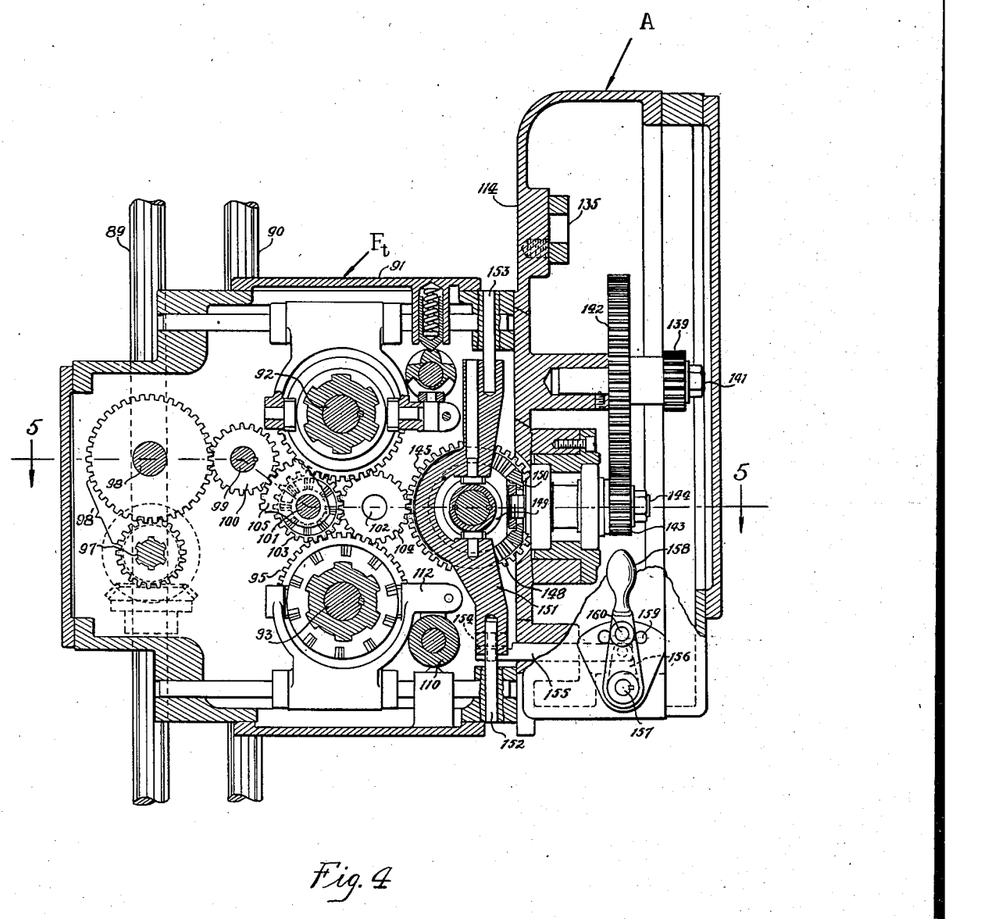
Fig. 4 is a sectional view taken substantially along lines 4—4 of Figs. 2 and 5.
Figure 5:
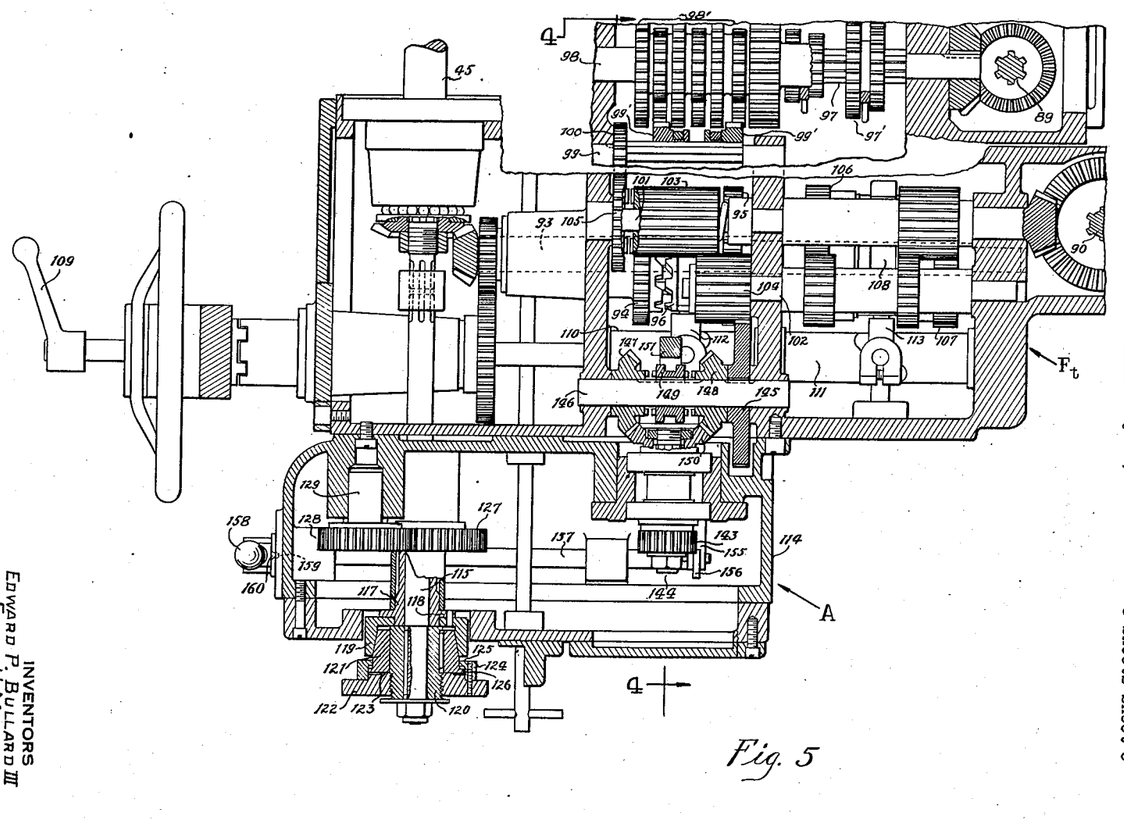
Fig. 5 is a sectional view taken substantially along line 5—5 of Figs. 1 and 4.

Referring to Fig. 4, the feed-works transmission Ft comprises a box-like housing 91 through which the shafts 89 and 90 pass, and in which a pair of driving shafts 92 and 93 are journaled. The shafts 92 and 93 are connected to the shafts 50 and 45 respectively, through suitable bevel gears (Fig. 5). The shafts 92 and 93 are adapted to be rotated at a plurality of relatively slow speeds of rotation during a working operation, and at a substantially constant relatively fast speed when it is desired to move the head Ht into and out of working position. Accordingly, each of the shafts 92 and 93 is provided with oppositely-rotatable driving means. Referring to Fig. 5, in which only shaft 93 and its associated parts are disclosed, a pair of identical gears 94 and 95 are freely journaled on the shaft 93. The adjacent faces of the gears 94 and 95 are provided with clutch-engaging teeth adapted to co-operate with clutch-engaging teeth on a shiftable element 96 splined to the shaft 93. The gears 94 and 95 are adapted to be rotated in opposite directions at a plurality of relatively slow speeds by a speed reduction unit and a reversing mechanism. Referring to Figs. 4 and 5, the feed-drive shaft 89 is maintained in driving engagement with a shaft 97 through a pair of bevel gears, one of which is splined to shaft 89. A plurality of shiftable gears 97' are splined on the shaft 97 and cooperate with a plurality of gears (not shown) keyed to shaft 98. A plurality of speed-reducing gears 98' are journaled on shafts 97 and 98, certain of which cooperate with additional shiftable gears 99' splined to a shaft 99. This speed reduction gear train provides a plurality of relatively slow speeds of rotation from shaft 89, all as more fully described in co-pending application Serial No. 299,134. These reduced rotative speeds of shaft 89 are taken off shaft 99 through a gear 100 keyed thereto which is adapted to mesh with a gear of the reversing mechanism.

The reversing mechanism comprises a pair of auxiliary shafts 101 and 102 that are adapted to support gears 103 and 104 thereon. Gears 103 and 104 are journaled on the shafts 101 and 102 and are adapted to partially overlap and intermesh. An additional gear 105 is likewise journaled on the shaft 101 and meshes with the gear 100 on shaft 99. An overload clutch is provided between the gear 105 and the gear 103. The gear 103 is adapted to mesh with the gear 94 on shaft 93. The gear 104 is adapted to mesh with the gear 95 on shaft 93. Axial movement of the shiftable element 96 on shaft 93 will cause the latter to be rotated in opposite directions at a plurality of separate distinct speeds that are definitely related to the speed at which the table W is rotated.

The shaft 93 is additionally provided with means adapted to be oppositely rotated at a substantially constant, relatively fast speed. This means comprises a pair of gears 106 and 107 journaled on shaft 93. Gears 106 and 107 are adapted to be rotated in opposite directions at substantially a constant relatively fast speed by the vertically disposed splined shaft 90. A shiftable friction clutch element 108 is splined to the shaft 93 and upon axial movement thereof, shaft 93 is adapted to be rotated in opposite directions at a substantial constant, relatively fast speed. Axial shifting of the elements 96 and 108 is effected by the operation of a hand lever 109 which is adapted to selectively oscillate a pair of coaxial sleeves 110 and 111 that are provided with peripheral cam slots which control the movement of yoke elements 112 and 113 connected to the elements 96 and 108, all as more fully described in co-pending application, Serial No. 299,134.

The shaft 92 of the feed-works Ft likewise journals two pairs of gears, identical with, and driven in the same directions by the same means that drives gears 94, 95, 106 and 107 on shaft 93.

Figure 6:
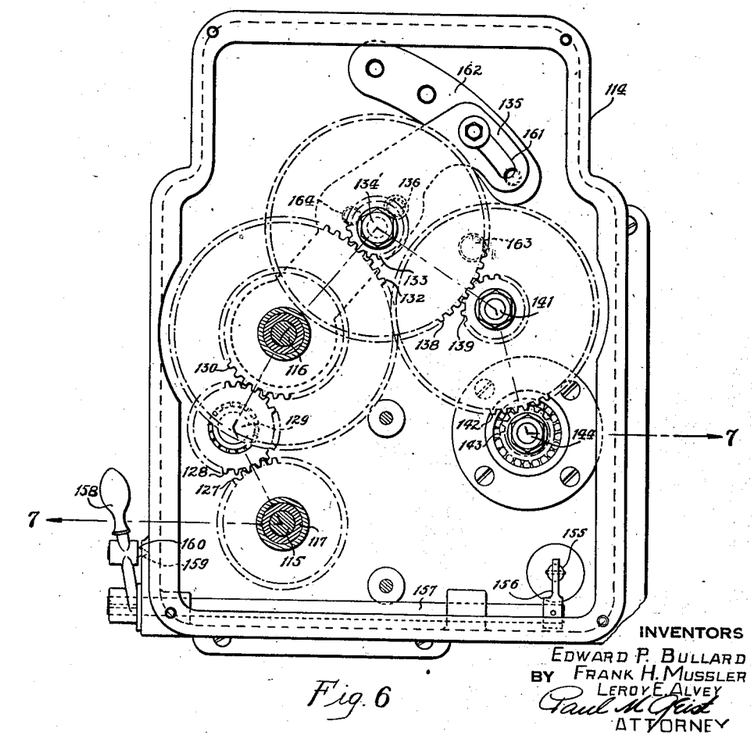
Fig. 6 is a side elevational view of a feature of the invention as viewed along the line 6—6 of Fig. 1, the cover being removed.
Figure 7:
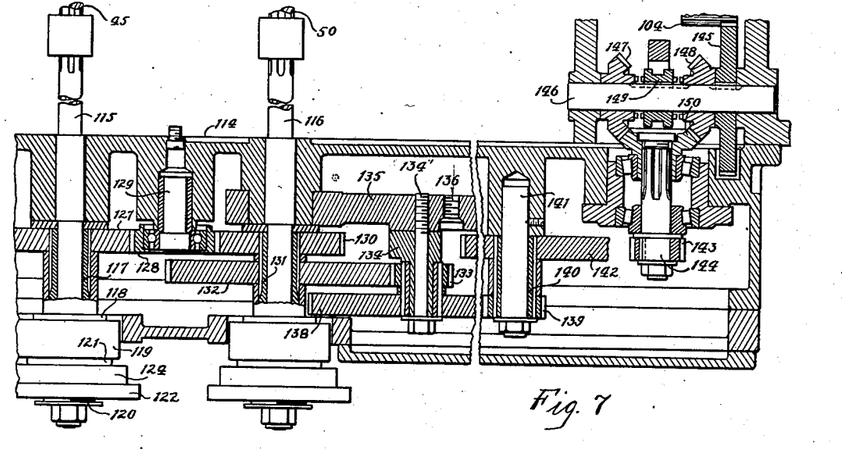
Fig. 7 is a stretch-out sectional view, taken substantially along the line 7—7 of Fig. 6.

Referring to Figs. 4, 5, 6 and 7, the attachment A comprises a housing 114 adapted to be rigidly secured to one side of the feed-works transmission Ft. A pair of driving shafts 115 and 116 are journaled within the housing 114 and are adapted to be connected to the shafts 45 and 50 respectively. The shafts 115 and 116 are adapted to be driven by the feed-works transmission Ft through a change-gear train for modifying the rotation of shafts 45 and 50 to thereby modify the rate of movement of the head Ht along its respective paths relative to the movement imparted to said head by the transmission Ft. The driving shafts 115 and 116 are adapted to be manually connected to, and disconnected from the gear train within the attachment A. Referring to Fig. 5, a driving sleeve 117 is journaled on shaft 115 and is provided with a flange 118 to which a cup-shaped friction clutch member 119 is attached. An additional sleeve 120 is journaled on the outer end of shaft 115 and a friction clutch element 121, adapted to cooperate with the cup-shaped element 119, is splined to the sleeve 120. The sleeve 120 is provided with a threaded portion on which a hand wheel 122 is threaded. The hand wheel 122 is provided with an abutment surface 123 that engages the friction clutch element 121 so that rotative movement of the hand wheel 122 in one direction will cause the clutch element 121 to be forced into clutching engagement with the cup-shaped element 119. The hand wheel 122 also includes a collar 124 having an annular portion 125 that cooperates with a flange 126 on the clutch element 121. Accordingly, rotative movement of the hand wheel 122 in the opposite direction from that which causes the element 121 to engage the cup-shaped element 119 will draw the clutch element 121 from engagement with the cup-shaped element 119. Therefore, manually rotating the hand wheel 122 will effect a connection, or disconnection between the shaft 115 and the driving sleeve 117. Referring to Figs. 6 and 7, the driving sleeve 117 is provided with a spur gear 127 keyed thereto. The gear 127 is adapted to mesh with an idler gear 128 journaled on a stud 129 mounted within the housing 114. The idler gear 128 is adapted to mesh with a spur gear 130 keyed to a driving sleeve 131 that is journaled on the shaft 116. The shaft 116 is adapted to be connected to and disconnected from the driving sleeve 131 in the same manner that the shaft 115 is adapted to be connected to and disconnected from the driving sleeve 117. The gear ratio between the gears 130 and 127 is 1 to 1, thereby assuring identical rates of rotation of the shafts 115 and 116 through the gear train within the attachment A.

The adjustable gear train within the attachment A for enabling the machine tool to perform the various functions may be constructed in any one of a number of different ways and the one to be described is merely a preferred embodiment of the principles of the invention. Obviously, the manner and location of the mounting of the various change-gears within the attachment A may vary widely. In the preferred embodiment, a gear 132 is keyed to the sleeve 131 in spaced relation to the gear 130. The gear 132 is adapted to mesh with a gear 133 keyed to a sleeve journaled on a removable supporting boss 134 that is fixed to an arm 135 by a threaded stud 134' pivotally mounted on the boss within which shaft 116 is journaled. The boss 134 is provided with a spacing shoulder for locating the gear 133 in the plane of its mating gear 132.

A gear 138 is likewise keyed to the sleeve that is journaled on the boss 134. The spur gear 138 is spaced laterally from the gear 133 and meshes with an additional spur gear 139 keyed to a sleeve 140 journaled on a fixed stud 141. A spur gear 142 is likewise keyed to the sleeve 140 in lateral spaced relation to gear 139 and the plane containing gear 133. Gear 142 meshes with a spur gear 143 that is keyed to a driving shaft 144.

The gear train is adapted to be driven from the feed-works Ft through a reversing mechanism. Referring to Figs. 5 and 7, the gear 104 that drives the gear 95 is likewise adapted to mesh with a spur gear 145 keyed to a stub shaft 146. A pair of oppositely facing bevel gears 147 and 148 are journaled on the stub shaft 146 and the adjacent faces of said bevel gears are provided with clutch-engaging teeth adapted to mesh with mating teeth on an axially-shiftable spool 149 splined to the stub shaft 146. The end of shaft 144 opposite to that which supports the spur gear 143 is provided with a bevel gear 150 that is adapted to mesh with both of the bevel gears 147 and 148. Inasmuch as the gear 104 is constantly driven so long as the work table W is driven, the change gear train and driving shafts 115 and 116 may be driven in either direction under the influence of the attachment A, and independently of the driving connection between the feed-works Ft and the shafts 45 and 50. Therefore, the shafts 45 and 50 are provided with two separate and independent drives.

Referring to Fig. 4, axial shifting of the spool 149 for reversing the drive of shafts 115 and 116 may be accomplished by providing a pivotal yoke member 151 journaled on pins 152 and 153 mounted within the housing 91 of the feed-works Ft. One arm of the yoke 151 is provided with an integral upstanding lever 154 that is adapted to be connected to a pull rod 155. Referring to Fig. 6, the end of rod 155 opposite that which is connected to the lever 154 is fixed to a crank element 156 that is keyed to a relatively long horizontally disposed shaft 157 that extends to the outside of the housing 114 of the attachment A, and to the outer end of which a crank arm 158 is keyed. A pad provided with recesses 159 is located in cooperative position with respect to the crank arm 158 which latter includes a spring pressed detent 160 adapted to cooperate with the recesses 159. Oscillation of the crank arm 158 will cause oscillation of the yoke 151 and axial shifting of the spool 149 to connect either bevel gears 147 or 148 to the stub shaft 146 that is driven from the feed-works Ft by the spur gear 145. Accordingly, the drive produced by the attachment A may be reversed by operating crank 158.

Referring to Fig. 6, the gears 127, 128 and 130 remain the same for all the functions of the attachment A. The gears 138 and 139 of the gear train are the most readily accessible and it is, therefore, desirable to make as many gear changes as possible within the gear train on the axes supporting gears 138 and 139. In order to increase the number of gear changes possible between the axes of gears 138 and 139, the pivotal arm 135 is adapted to be locked in adjusted position about the axis of gear 130. Accordingly, the arm 135 is provided with an elongated slot 161 through which a clamp is adapted to pass to cooperate with threaded openings arranged in an arc on a pad 162 fixed to the housing of the attachment A. In order to employ gears 138 of a sufficiently large diameter to cover a wide range of gear changes and to maintain the dimensions of the housing for attachment A within practical limits, a threaded hole 136 is provided in the arm 135 for adjustably locating the supporting boss 134. The new axis for the gears 138 provided by the opening 136 will accommodate gears 138 of larger diameter than the original axis of boss 134 within a given size housing.

The gear ratio for the gears 143, 142, 139, 138 and 133, 132 for controlling the movement of the head Ht for producing angular turning throughout substantially 45° can be represented by the equation:

$$K \cdot \frac{\text{No. teeth of 143}}{\text{No. teeth of 142}} \cdot \frac{\text{No. teeth of 139}}{\text{No. teeth of 138}} \cdot \frac{\text{No. teeth of 133}}{\text{No. teeth of 132}} =$$

tangent of the desired angle at which head Ht is to be moved

The constant K is determined by the ratio of the revolutions between the gear 145 and the revolutions of the shaft 45 or 50 when rotating under the influence of the feed-works transmission during a working operation. In the present embodiment, the gear 104 in the feed-works rotates two revolutions while the work-supporting table W rotates through a single revolution. The ratio between the gears 104 and 145 is 1:2 so that the gear 145 rotates through one revolution as the table W rotates through a single revolution. The shafts 45 and 50 are rotated through a half revolution as the table W rotates through a single revolution under the influence of a feed-works setting of a ¼" feed. Therefore, K is equal to 1÷½=2. The following table lists a representative set of change gears for controlling the movement of the tool head Ht along any straight line between substantially 45°. Of course, other change-gear combinations could be employed.

|  | Angle | Tangent | Change gears | | | | | |  | Angle | Tangent | Change gears | | | | | |  |
|---|---|---|---|---|---|---|---|---|---|---|---|---|---|---|---|---|---|---|
|  |  |  | 143 | 142 | 139 | 138 | 133 | 132 |  |  |  | 143 | 142 | 139 | 138 | 133 | 132 |  |
| Group I | 1°47′ | .03125 | 16 | 64 | 18 | 72 | 18 | 72 |  | 23°30′ | .43443 | 40 | 40 | 53 | 61 | 18 | 72 | Group II |
|  | 2°00′ | .03493 | 16 | 64 | 19 | 68 | 18 | 72 |  | 24°00′ | .44545 | 40 | 40 | 49 | 55 | 18 | 72 |  |
|  | 2°30′ | .04365 | 16 | 64 | 22 | 63 | 18 | 72 |  | 24°30′ | .45536 | 40 | 40 | 51 | 56 | 18 | 72 |  |
|  | 3°00′ | .05242 | 16 | 64 | 26 | 62 | 18 | 72 |  | 25°00′ | .46667 | 40 | 40 | 56 | 60 | 18 | 72 |  |
|  | 3°30′ | .06132 | 16 | 64 | 26 | 53 | 18 | 72 |  | 25°30′ | .47674 | 40 | 40 | 41 | 43 | 18 | 72 |  |
|  | 4°00′ | .06985 | 16 | 64 | 38 | 68 | 18 | 72 |  | 26°00′ | .48750 | 40 | 40 | 39 | 40 | 18 | 72 |  |
|  | 4°30′ | .07870 | 16 | 64 | 34 | 54 | 18 | 72 |  | 26°34′ | .50000 | 40 | 40 | 35 | 35 | 18 | 72 |  |
|  | 5°00′ | .08750 | 16 | 64 | 35 | 50 | 18 | 72 |  | 27°00′ | .50909 | 40 | 40 | 56 | 55 | 18 | 72 |  |
|  | 5°30′ | .09615 | 16 | 64 | 50 | 65 | 18 | 72 |  | 27°30′ | .52041 | 40 | 40 | 51 | 49 | 18 | 72 |  |
|  | 6°00′ | .10500 | 16 | 64 | 42 | 50 | 18 | 72 |  | 28°00′ | .53125 | 40 | 40 | 51 | 48 | 18 | 72 |  |
|  | 6°30′ | .11389 | 16 | 64 | 41 | 45 | 18 | 72 |  | 28°30′ | .54237 | 40 | 40 | 64 | 59 | 18 | 72 |  |
|  | 7°00′ | .12277 | 16 | 64 | 55 | 56 | 18 | 72 |  | 29°00′ | .55435 | 40 | 40 | 51 | 46 | 18 | 72 |  |
|  | 7°30′ | .13159 | 16 | 64 | 60 | 57 | 18 | 72 |  | 29°30′ | .56579 | 40 | 40 | 43 | 38 | 18 | 72 |  |
|  | 8°00′ | .14063 | 16 | 64 | 54 | 48 | 18 | 72 |  | 30°00′ | .57692 | 40 | 40 | 60 | 52 | 18 | 72 |  |
|  | 8°30′ | .14946 | 16 | 64 | 55 | 46 | 18 | 72 |  | 30°30′ | .58929 | 40 | 40 | 66 | 56 | 18 | 72 |  |
|  | 9°00′ | .15833 | 16 | 64 | 57 | 45 | 18 | 72 |  | 30°58′ | .60000 | 40 | 40 | 60 | 50 | 18 | 72 |  |
|  | 9°30′ | .16750 | 16 | 64 | 67 | 50 | 18 | 72 |  | 31°30′ | .61250 | 40 | 40 | 49 | 40 | 18 | 72 |  |
|  |  |  |  |  |  |  |  |  |  | 32°00′ | .62500 | 40 | 40 | 50 | 40 | 18 | 72 |  |
|  |  |  |  |  |  |  |  |  |  | 32°30′ | .63725 | 40 | 40 | 65 | 51 | 18 | 72 |  |
| Group II | 10°00′ | .17606 | 40 | 40 | 25 | 71 | 18 | 72 |  | 33°00′ | .64893 | 40 | 40 | 61 | 47 | 18 | 72 |  |
|  | 10°30′ | .18548 | 40 | 40 | 23 | 62 | 18 | 72 |  | 33°30′ | .66129 | 40 | 40 | 41 | 31 | 18 | 72 |  |
|  | 11°00′ | .19403 | 40 | 40 | 26 | 67 | 18 | 72 |  | 34°00′ | .67391 | 40 | 40 | 62 | 46 | 18 | 72 |  |
|  | 11°30′ | .20313 | 40 | 40 | 26 | 64 | 18 | 72 |  | 34°28′ | .68627 | 40 | 40 | 70 | 51 | 18 | 72 |  |
|  | 12°00′ | .21212 | 40 | 40 | 28 | 66 | 18 | 72 |  |  |  |  |  |  |  |  |  |  |
|  | 12°30′ | .22131 | 40 | 40 | 27 | 61 | 18 | 72 |  |  |  |  |  |  |  |  |  |  |
|  | 13°00′ | .23077 | 40 | 40 | 30 | 65 | 18 | 72 |  | 35°00′ | .70000 | 40 | 40 | 35 | 50 | 36 | 72 | Group III |
|  | 13°30′ | .24000 | 40 | 40 | 24 | 50 | 18 | 72 |  | 35°28′ | .71212 | 40 | 40 | 47 | 66 | 36 | 72 |  |
|  | 14°02′ | .25000 | 40 | 40 | 25 | 50 | 18 | 72 |  | 35°58′ | .72581 | 40 | 40 | 45 | 62 | 36 | 72 |  |
|  | 14°30′ | .25862 | 40 | 40 | 30 | 58 | 18 | 72 |  | 36°30′ | .74000 | 40 | 40 | 37 | 50 | 36 | 72 |  |
|  | 15°00′ | .26786 | 40 | 40 | 30 | 56 | 18 | 72 |  | 37°00′ | .75362 | 40 | 40 | 52 | 69 | 36 | 72 |  |
|  | 15°30′ | .27692 | 40 | 40 | 36 | 65 | 18 | 72 |  | 37°30′ | .76744 | 40 | 40 | 33 | 43 | 36 | 72 |  |
|  | 16°00′ | .28676 | 40 | 40 | 39 | 68 | 18 | 72 |  | 38°00′ | .78125 | 40 | 40 | 50 | 64 | 36 | 72 |  |
|  | 16°30′ | .29630 | 40 | 40 | 32 | 54 | 18 | 72 |  | 38°30′ | .79487 | 40 | 40 | 31 | 39 | 36 | 72 |  |
|  | 17°00′ | .30556 | 40 | 40 | 33 | 54 | 18 | 72 |  | 39°00′ | .81034 | 40 | 40 | 47 | 58 | 36 | 72 |  |
|  | 17°30′ | .31522 | 40 | 40 | 29 | 46 | 18 | 72 |  | 39°30′ | .82353 | 40 | 40 | 56 | 68 | 36 | 72 |  |
|  | 18°00′ | .32500 | 40 | 40 | 39 | 60 | 18 | 72 |  | 39°58′ | .83823 | 40 | 40 | 57 | 68 | 36 | 72 |  |
|  | 18°26′ | .33333 | 40 | 40 | 34 | 51 | 18 | 72 |  | 40°30′ | .85484 | 40 | 40 | 53 | 62 | 36 | 72 |  |
|  | 19°00′ | .34444 | 40 | 40 | 31 | 45 | 18 | 72 |  | 41°00′ | .86885 | 40 | 40 | 53 | 61 | 36 | 72 |  |
|  | 19°30′ | .35417 | 40 | 40 | 34 | 48 | 18 | 72 |  | 41°35′ | .88406 | 40 | 40 | 61 | 69 | 36 | 72 |  |
|  | 20°00′ | .36363 | 40 | 40 | 32 | 44 | 18 | 72 |  | 42°00′ | .90000 | 40 | 40 | 63 | 70 | 36 | 72 |  |
|  | 20°28′ | .37313 | 40 | 40 | 50 | 67 | 18 | 72 |  | 42°30′ | .91667 | 40 | 40 | 44 | 48 | 36 | 72 |  |
|  | 21°00′ | .38372 | 40 | 40 | 33 | 43 | 18 | 72 |  | 43°00′ | .93182 | 40 | 40 | 41 | 44 | 36 | 72 |  |
|  | 21°30′ | .39344 | 40 | 40 | 48 | 61 | 18 | 72 |  | 43°30′ | .94872 | 40 | 40 | 37 | 39 | 36 | 72 |  |
|  | 22°00′ | .40385 | 40 | 40 | 42 | 52 | 18 | 72 |  | 44°00′ | .96491 | 40 | 40 | 55 | 57 | 36 | 72 |  |
|  | 22°30′ | .41379 | 40 | 40 | 48 | 58 | 18 | 72 |  | 44°30′ | .98214 | 40 | 40 | 55 | 56 | 36 | 72 |  |
|  | 23°00′ | .42453 | 40 | 40 | 45 | 53 | 18 | 72 |  | 45°00′ | 1.0000 | 40 | 40 | 40 | 40 | 36 | 72 |  |

If it is desired to interpolate between the angles given in the above table, while employing gears 132, 133, 142 and 143 as listed above, the proper gears 138 and 139 may be obtained from the following formula.

Group 1.—Desired tangent of angle divided by .125=ratio of $$\frac{\text{No. teeth of gear 139}}{\text{No. teeth of gear 138}}$$

Group 2.—Desired tangent of angle divided by .5=ratio of $$\frac{\text{No. teeth of gear 139}}{\text{No. teeth of gear 138}}$$

Group 3.—Desired tangent of angle divided by 1=ratio of $$\frac{\text{No. teeth of gear 138}}{\text{No. teeth of gear 139}}$$

As previously stated, it is desirable to limit the number of changes of gears 132, 133 and 142, 143 to as few as possible whereas gears 138 and 139 may be readily changed without difficulty. The selection of as few sizes of change gears to accomplish the result of controlling the movement of the head throughout substantially 45° has been carried out in selecting the various gears. However, three changes of the relatively inaccessible gears of the attachment A are necessary in order to cover the entire range of operation of the attachment for controlling the movement of the head Ht throughout 45°. The first group of gear changes requires gears 138 and 139 to be changed only. In the second group, the gears 132 and 133 remain unchanged but the gears 142 and 143 are changed from a 1:4 ratio in Group 1 to a 1:1 ratio in Group 2. In Group 3, the gears 142 and 143 remain unchanged from Group 2 but the gears 132 and 133 require changing from a ratio of 1:4 to a ratio of 1:2.

Figure 9:
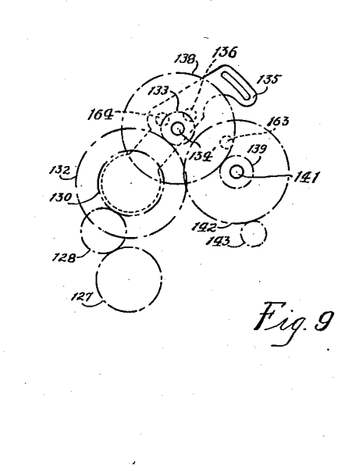
Figs. 9 to 13 inclusive are schematic views of a gear train for producing the various functions of the machine tool.

Movement of the head Ht along any straight line in a single plane and throughout substantially 360° may be effected by arranging the gears listed in the preceding table in accordance with the diagrammatic sketch of Fig. 9 and selectively operating the apparatus.

Figure 8:
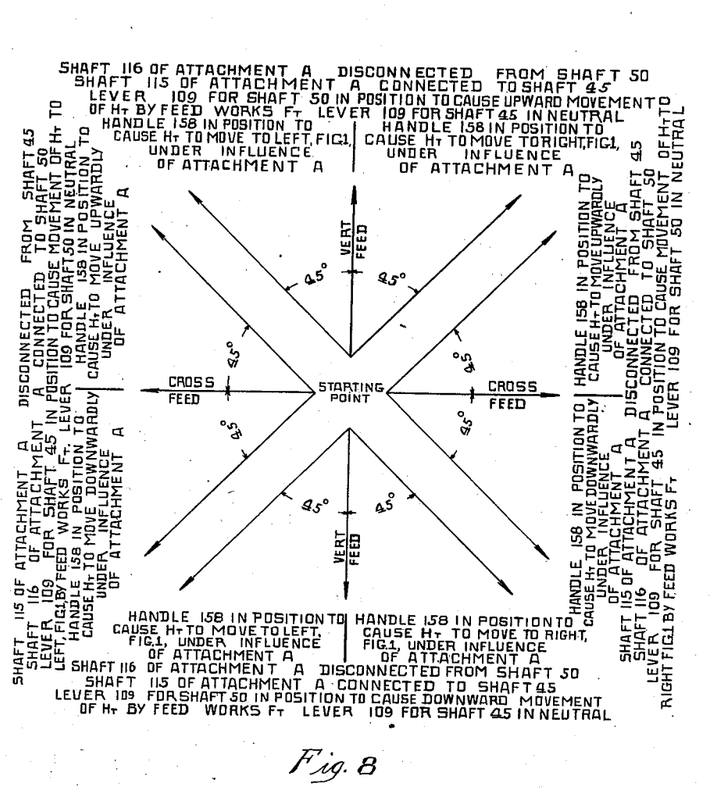
Fig. 8 is a chart showing the range of operation of certain features of the invention.

Referring to Fig. 8, wherein a chart is disclosed including four 90° V-shaped segments, the tool-head Ht may be moved along any straight line within the upper V-shaped segment providing the driving shaft 116 of the attachment A is disconnected from the shaft 50 and the driving shaft 115 is connected to the driving shaft 45. Furthermore, it is necessary that the hand lever 109 that controls the drive between the feed-works Ft and the shaft 50 is positioned so that the shaft 50 is driven through the feed-works Ft in a direction causing the head Ht to move upwardly; and the lever 109 for shaft 45 is in neutral. With the attachment and feed-works transmission Ft arranged as just described, suitable changes of the gears within the gear train of the attachment A as listed in the above table, and operation of the crank arm 158 for reversing the operation of the gear train will enable the tool head Ht to be moved along any straight line in a single plane substantially throughout the 90° of the upper V-shaped segment of Fig. 8.

In order to move the tool head Ht along any line within the V-shaped segment at the right in Fig. 8, it is necessary to move the head in a horizontal direction under the influence of the feed-works transmission Ft and to move said tool head along its vertical path under the influence of the attachment A. Accordingly, the driving shaft 115 within the attachment A is disconnected from the screw 45 by disengaging the clutch elements 119 and 121; the drive shaft 116 is connected to the splined shaft 50; the handle 109 for shaft 45 is positioned so that said shaft is driven by the feed-works Ft to move head Ht to the right as viewed in Fig. 1; and the lever 109 for the shaft 50 is positioned in neutral. This arrangement of the attachment A and the feed-works Ft, enables the head Ht to be moved along any straight line within the right hand V-shaped segment of Fig. 8 by suitably changing the gears within the gear train of the attachment A in accordance with those listed in the above table, and by reversing the crank 158.

In order to move the head Ht along any straight line between the confines of the lower V-shaped segment, Fig. 8, the setting of the attachment A and the feed-works Ft is substantially identical with that for moving the head Ht along any line within the upper V-shaped segment of Fig. 8. However, the lever 109 for shaft 50 is positioned so that the head Ht is moved downwardly rather than upwardly under the influence of the feed-works Ft.

The arrangement of the attachment A and the feed-works Ft in order to cover the left-hand V-shaped segment of Fig. 8 is substantially identical with that setting of the attachment and feed-works for covering the right-hand V-shaped segment of Fig. 8. However, the lever 109 for the shaft 45 is positioned so that the head Ht is moved to the left as viewed in Fig. 1 under the influence of the feed-works Ft.

Not only do the clutch elements 119 and 121 permit selective connection and disconnection of the shafts 115 and 116 with the screw 45 and the splined shaft 50 for controlling the operation of the attachment A, but they also provide means for disconnecting the shafts 115 and 116 from shafts 45 and 50 when it is desired to move the tool head Ht into and out of operating position at a relatively rapid rate by the traverse mechanism of the feed-works. If this function of the attachment A were not possible, and the feed-works Ft were set to move the head Ht at a relatively rapid rate through the traverse mechanism, the shafts 115 and 116 would be rotated at a very rapid rate, and the speed reduction gearing, including gears 127, 128, 130, 132, 133, 138, 139, 142 and 143 would be rotated at a detrimentally fast rate of speed.

Figure 10:
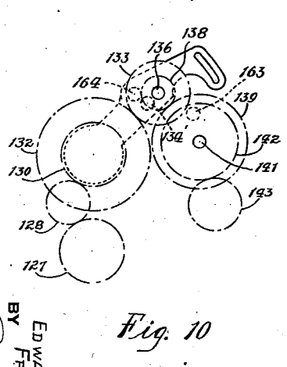

The attachment A not only includes means for effecting angular turning throughout substantially 360° but also includes means for cutting English and metric threads, producing English and metric drum scoring and cutting English and metric scrolls. Preferably, English threads are cut with the main or turret head Ht, although they may be cut with the side head Hs. The arrangement of the apparatus for cutting English threads necessitates the disconnection of the driving shaft 115 from the screw 45 by manipulating the clutch elements 119 and 121; positioning the lever 109 for the shaft 45 in neutral; and the clutching of shaft 116 to the shaft 50 so that the head Ht is moved in a vertical direction only, and under the influence of the attachment A. With the gears of the attachment A arranged as shown in Fig. 10, the same gear 132 for producing angular turning is employed in the attachment for cutting English threads. Employing the 132 gear and the 133 gear on the axis provided by the opening 136, both of which were used for angular turning, enables the employment of gears 138 and 139 of a practical size for cutting English threads.

In the embodiment disclosed, the lead of the screw 47 (Fig. 2) is ½″ and the shaft 144 is rotated one revolution with one revolution of table W with a feed-works setting of ¼" feed. Therefore, the ratio of the gears within the train of the attachment A for a given pitch of thread may be represented by the following equation:

$$\tfrac{1}{2} \cdot \frac{\text{No. teeth of 143}}{\text{No. teeth of 142}} \cdot \frac{\text{No. teeth of 139}}{\text{No. teeth of 138}} \cdot \frac{\text{No. teeth of 133}}{\text{No. teeth of 132}} =$$

feed per revolution

The following table has been computed as one example of a set of change gears for producing English threads. These change gears have been selected with due regard to gear size and threads in common use. Other size gears may, of course, be employed.

| No. thds. | Gear changes | | | | | | Feed per rev. |
|---|---|---|---|---|---|---|---|
| | 143 | 142 | 139 | 138 | 133 | 132 | |
| 2 | 32 | 48 | 60 | 20 | 36 | 72 | 1/2 |
| 3 | 32 | 48 | 54 | 27 | 36 | 72 | 1/3 |
| 4 | 32 | 48 | 48 | 32 | 36 | 72 | 1/4 |
| 5 | 32 | 48 | 42 | 35 | 36 | 72 | 1/5 |
| 6 | 32 | 48 | 40 | 40 | 36 | 72 | 1/6 |
| 7 | 32 | 48 | 36 | 42 | 36 | 72 | 1/7 |
| 8 | 32 | 48 | 36 | 48 | 36 | 72 | 1/8 |
| 9 | 32 | 48 | 36 | 54 | 36 | 72 | 1/9 |
| 10 | 32 | 48 | 36 | 60 | 36 | 72 | 1/10 |
| 11 | 32 | 48 | 30 | 55 | 36 | 72 | 1/11 |
| 11½ | 32 | 48 | 24 | 46 | 36 | 72 | 1/11½ |
| 12 | 32 | 48 | 30 | 60 | 36 | 72 | 1/12 |
| 14 | 32 | 48 | 24 | 56 | 36 | 72 | 1/14 |
| 16 | 32 | 48 | 24 | 64 | 36 | 72 | 1/16 |
| 18 | 32 | 48 | 20 | 60 | 36 | 72 | 1/18 |

With the attachment A arranged as shown in Fig. 10, and the gears 132, 133 and 142, 142 mounted within the gear train having the number of teeth as indicated in the above table, any desired thread may be cut by simply changing the gears 138 and 139 to conform with the proper gears as listed in said table. Threads may be cut with the head Ht moving vertically downwardly or vertically upwardly by simply operating the crank arm 158.

English drum scoring may be performed by either of the heads Hs or Ht. However, it is preferably performed with the side head Hs. When it is desired to produce English drum scoring, the driving shaft 116 of the attachment A must be disengaged from the shaft 70 that controls the horizontal movement of the side head Hs, the hand lever 109 for the feed-works Fs that controls the shaft 70 must be in neutral at all times, and the driving shaft 115 of the attachment A must be connected to the shaft 64 of the feed-works Fs that controls the vertical movement of the head Hs.

The gears and racks that control the movement of the side head Hs are designed so that the lead of the head Hs is the same as that for the screws 45 and 47, or ½". Therefore, the ratio of the gears within the attachment A for producing English drum scoring may be represented as follows provided the feed-works is set at ¼" feed:

$$\tfrac{1}{2} \cdot \frac{\text{No. teeth of 143}}{\text{No. teeth of 142}} \cdot \frac{\text{No. teeth of 139}}{\text{No. teeth of 138}} \cdot \frac{\text{No. teeth of 133}}{\text{No. teeth of 132}} =$$

feed per revolution

Figure 11:
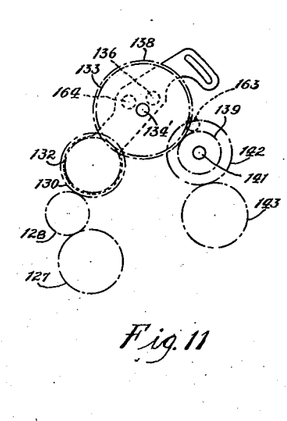
Figure 12:
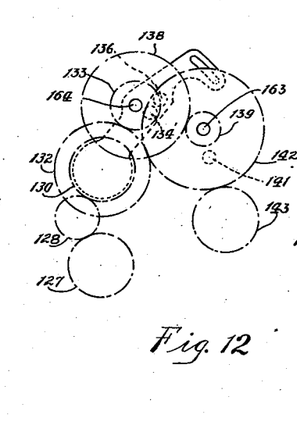
Figure 13:
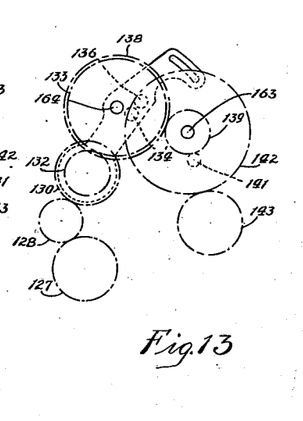

One arrangement of the change gears within the attachment A has been worked out, whereby a complete range of pitches for English drum scoring can be performed by simply changing the gears 138 and 139 (Fig. 11). Of course, using a different setting for the feed of the transmission Fs than ¼", will alter the pitches produced by the change gears as listed in the following table. It is, of course, obvious that other gear arrangements may be employed in the attachment for producing the same results.

| Pitch | Gear changes | | | | | | Feed per rev. |
|---|---|---|---|---|---|---|---|
| | 143 | 142 | 139 | 138 | 133 | 132 | |
| ¼ | 40 | 40 | 20 | 60 | 54 | 36 | ¼ |
| 5⁄16 | 40 | 40 | 25 | 60 | 54 | 36 | 5⁄16 |
| 3⁄8 | 40 | 40 | 27 | 54 | 54 | 36 | 3⁄8 |
| 7⁄16 | 40 | 40 | 35 | 60 | 54 | 36 | 7⁄16 |
| ½ | 40 | 40 | 32 | 48 | 54 | 36 | ½ |
| 9⁄16 | 40 | 40 | 36 | 48 | 54 | 36 | 9⁄16 |
| 5⁄8 | 40 | 40 | 40 | 48 | 54 | 36 | 5⁄8 |
| 11⁄16 | 40 | 40 | 44 | 48 | 54 | 36 | 11⁄16 |
| ¾ | 40 | 40 | 48 | 48 | 54 | 36 | ¾ |
| 13⁄16 | 40 | 40 | 52 | 48 | 54 | 36 | 13⁄16 |
| 7⁄8 | 40 | 40 | 56 | 48 | 54 | 36 | 7⁄8 |
| 15⁄16 | 40 | 40 | 45 | 36 | 54 | 36 | 15⁄16 |
| 1 | 40 | 40 | 44 | 33 | 54 | 36 | 1 |
| 1 1⁄16 | 40 | 40 | 51 | 36 | 54 | 36 | 1 1⁄16 |
| 1 1⁄8 | 40 | 40 | 48 | 32 | 54 | 36 | 1 1⁄8 |
| 1 3⁄16 | 40 | 40 | 57 | 36 | 54 | 36 | 1 3⁄16 |
| 1 ¼ | 40 | 40 | 60 | 36 | 54 | 36 | 1 ¼ |
| 1 5⁄16 | 40 | 40 | 63 | 36 | 54 | 36 | 1 5⁄16 |
| 1 3⁄8 | 40 | 40 | 55 | 30 | 54 | 36 | 1 3⁄8 |
| 1 7⁄16 | 40 | 40 | 69 | 36 | 54 | 36 | 1 7⁄16 |
| 1 ½ | 40 | 40 | 54 | 27 | 54 | 36 | 1 ½ |
| 1 9⁄16 | 40 | 40 | 50 | 24 | 54 | 36 | 1 9⁄16 |
| 1 5⁄8 | 40 | 40 | 65 | 30 | 54 | 36 | 1 5⁄8 |
| 1 11⁄16 | 40 | 40 | 63 | 28 | 54 | 36 | 1 11⁄16 |
| 1 ¾ | 40 | 40 | 56 | 24 | 54 | 36 | 1 ¾ |

English scroll cutting can be accomplished by employing the attachment A on either the side head Hs or the turret head Ht with the geartrain of the attachment set for performing English drum scoring. However, in order to produce English scroll cutting, it is necessary to disconnect the shaft 116 from the shaft 50 and to connect shaft 115 with the shaft 45; or to disconnect the shaft 115 from shaft 64 and connect shaft 116 to shaft 70.

For the same reason that English thread cutting is performed by the main or turret head, metric thread cutting is likewise preferably performed by said main head. The gear train of the attachment A, however, requires a standard conversion gear of 127 teeth in order to convert the resulting threads from the English to the metric system. In the present embodiment, the gear 142 is provided with 127 teeth and constitutes the conversion gear. The diameter of the 127 tooth gear requires a new axis 163 spaced from the axis 141 sufficiently to permit the conversion gear to cooperate with a gear on the 144 axis. In order to limit the change gears to the most accessible, i. e. gears 138 and 139, it is necessary to maintain a fixed center distance for gears 132 and 133, which distance does not correspond with either the original axis for the boss 134 or that of the opening 136. Accordingly, an additional threaded opening 164 is provided in the arm 135 adapted to provide a connection for the boss 134.

One set of the gears 132, 133, 138, 139, 142 and 143 has been computed to illustrate a practical embodiment of the attachment for cutting metric threads. This computation is likewise based upon a setting of the feed-works Ft at ¼". The method of calculating the gears for the change-gear train is the same as the method employed with respect to English thread cutting except, gear 142, having 127 teeth, must be employed throughout the entire range. The following table is a list of change gears adapted to be employed in the attachment A for producing the most commonly used metric threads. Of course, different gears may be employed so long as one of them contains 127 teeth.

| Pitch, mm. | Gear changes | | | | | | Fractional feeds per rev., inches |
|---|---|---|---|---|---|---|---|
| | 143 | 142 | 139 | 138 | 133 | 132 | |
| 1 | 75 | 127 | 20 | 70 | 28 | 60 | 5/127 |
| 1.25 | 75 | 127 | 25 | 70 | 28 | 60 | 6¼/127 |
| 1.5 | 75 | 127 | 30 | 70 | 28 | 60 | 7½/127 |
| 1.75 | 75 | 127 | 35 | 70 | 28 | 60 | 8¾/127 |
| 2 | 75 | 127 | 36 | 63 | 28 | 60 | 10/127 |
| 2.5 | 75 | 127 | 40 | 56 | 28 | 60 | 12½/127 |
| 3 | 75 | 127 | 42 | 49 | 28 | 60 | 15/127 |
| 3.5 | 75 | 127 | 45 | 45 | 38 | 60 | 17½/127 |
| 4 | 75 | 127 | 48 | 42 | 28 | 60 | 20/127 |
| 4.5 | 75 | 127 | 54 | 42 | 28 | 60 | 22½/127 |
| 5 | 75 | 127 | 60 | 42 | 28 | 60 | 25/127 |
| 6 | 75 | 127 | 60 | 35 | 28 | 60 | 30/127 |
| 7 | 75 | 127 | 60 | 30 | 28 | 60 | 35/127 |

Metric drum scoring is accomplished with the attachment A arranged in the same manner as it is arranged to produce English drum scoring, except that the standard conversion gear including 127 teeth must be employed.

The following table discloses a list of change gears to be employed in the attachment when metric drum scoring is performed.

| Pitch, mm. | Gear changes | | | | | | Fractional feeds per rev. (inches) |
|---|---|---|---|---|---|---|---|
| | 143 | 142 | 139 | 138 | 133 | 132 | |
| 8 | 75 | 127 | 26 | 65 | 64 | 24 | 40/127 |
| 9 | 75 | 127 | 27 | 60 | 64 | 24 | 45/127 |
| 10 | 75 | 127 | 30 | 60 | 64 | 24 | 50/127 |
| 11 | 75 | 127 | 33 | 60 | 64 | 24 | 55/127 |
| 12 | 75 | 127 | 36 | 60 | 64 | 24 | 60/127 |
| 13 | 75 | 127 | 39 | 60 | 64 | 24 | 65/127 |
| 14 | 75 | 127 | 42 | 60 | 64 | 24 | 70/127 |
| 15 | 75 | 127 | 45 | 60 | 64 | 24 | 75/127 |
| 16 | 75 | 127 | 48 | 60 | 64 | 24 | 80/127 |
| 17 | 75 | 127 | 51 | 60 | 64 | 24 | 85/127 |
| 18 | 75 | 127 | 54 | 60 | 64 | 24 | 90/127 |
| 19 | 75 | 127 | 57 | 60 | 64 | 24 | 95/127 |
| 20 | 75 | 127 | 50 | 50 | 64 | 24 | 100/127 |
| 21 | 75 | 127 | 63 | 60 | 64 | 24 | 105/127 |
| 22 | 75 | 127 | 55 | 50 | 64 | 24 | 110/127 |
| 23 | 75 | 127 | 46 | 40 | 64 | 24 | 115/127 |
| 24 | 75 | 127 | 54 | 45 | 64 | 24 | 120/127 |
| 25 | 75 | 127 | 50 | 40 | 64 | 24 | 125/127 |
| 26 | 75 | 127 | 52 | 40 | 64 | 24 | 130/127 |
| 27 | 75 | 127 | 54 | 40 | 64 | 24 | 135/127 |
| 28 | 75 | 127 | 56 | 40 | 64 | 24 | 140/127 |
| 29 | 75 | 127 | 58 | 40 | 64 | 24 | 145/127 |
| 30 | 75 | 127 | 54 | 36 | 64 | 24 | 150/127 |
| 31 | 75 | 127 | 62 | 40 | 64 | 24 | 155/127 |
| 32 | 75 | 127 | 56 | 35 | 64 | 24 | 160/127 |
| 33 | 75 | 127 | 66 | 40 | 64 | 24 | 165/127 |
| 34 | 75 | 127 | 68 | 40 | 64 | 24 | 170/127 |
| 35 | 75 | 127 | 63 | 36 | 64 | 24 | 175/127 |
| 36 | 75 | 127 | 63 | 35 | 64 | 24 | 180/127 |
| 37 | 75 | 127 | 74 | 40 | 64 | 24 | 185/127 |
| 38 | 75 | 127 | 57 | 30 | 64 | 24 | 190/127 |
| 39 | 75 | 127 | 78 | 40 | 64 | 24 | 195/127 |
| 40 | 75 | 127 | 60 | 30 | 64 | 24 | 200/127 |
| 41 | 75 | 127 | 82 | 40 | 64 | 24 | 205/127 |
| 42 | 75 | 127 | 63 | 30 | 64 | 24 | 210/127 |
| 43 | 75 | 127 | 86 | 40 | 64 | 24 | 215/127 |
| 44 | 75 | 127 | 66 | 30 | 64 | 24 | 220/127 |
| 45 | 75 | 127 | 63 | 28 | 64 | 24 | 225/127 |

Metric scroll cutting may be performed if the attachment is arranged in the same manner that it is arranged for producing English scroll cutting except that the change gears listed in the above table should be used instead of those listed for English drum scoring.

From the foregoing it is apparent that an attachment has been provided that is capable of producing angular turning throughout substantially 360°; cutting English and metric threads; producing English and metric drum scoring; and cutting English and metric scrolls, all of which functions may be accomplished by relatively simple manipulations.

Although the various features of the machine tool and attachment have been shown and described in detail to fully disclose one embodiment of the invention, it will be evident that numerous changes may be made in such detail, and certain features may be used without others, without departing from the principles of the invention.

What is claimed is:

1. Apparatus comprising in combination a member adapted to be moved along intersecting paths simultaneously; separate means for moving said member along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other to thereby effect movement of said member along any one of a plurality of straight lines within a single plane.

2. Apparatus comprising in combination, a member adapted to be moved along intersecting paths simultaneously; separate means for moving said member along each of said paths; a transmission for operating said separate means at a plurality of speeds, but at a constant rate relatively to each other; an attachment adapted to be connected to said transmission; and means within said attachment adapted to cooperate with means in said transmission including a separate reversing mechanism for varying the rate of operation of said separate means relatively to each other to effect movement of said member along a plurality of straight lines within a single plane.

3. A machine tool comprising in combination a tool-supporting head adapted to be moved simultaneously along intersecting paths; separate means for moving said head along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other thereby to effect movement of said head along any one of a plurality of straight lines within a single plane, said attachment including means adapted to be adjusted for controlling the movement of said head along one of its paths for cutting threads.

4. A machine tool, comprising in combination a tool-supporting head adapted to be moved simultaneously along intersecting paths; separate means for moving said head along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other thereby to effect movement of said head along a plurality of straight lines within a single plane, said means being adjustable for controlling the movement of said head along one of its paths for cutting English threads.

5. A machine tool comprising in combination a tool-supporting head adapted to be moved simultaneously along intersecting paths; separate means for moving said head along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other thereby to effect movement of said head along a plurality of straight lines within a single plane, said means being adjustable for controlling the movement of said head along one of its paths for cutting English threads, and for producing English drum scoring.

6. A machine tool comprising in combination a tool-supporting head adapted to be moved simultaneously along intersecting paths; separate means for moving said head along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other thereby to effect movement of said head along a plurality of straight lines within a single plane, said means being adjustable for controlling the movement of said head along one of its paths for cutting English threads, for producing English drum scoring, and for cutting metric threads.

7. A machine tool comprising in combination a tool-supporting head adapted to be moved simultaneously along intersecting paths; separate means for moving said head along each of said paths; a transmission for operating said separate means at a plurality of speeds, but at a constant rate relatively to each other; an attachment adapted to be connected to said transmission; and means within said attachment adapted to cooperate with said transmission to vary the rate of operation of said separate means relatively to each other thereby to effect movement of said head along a plurality of straight lines within a single plane, said means being adjustable for controlling the movement of said head along one of its paths for cutting English threads, for producing English drum scoring, for cutting metric threads, and for producing metric drum scoring.

8. Apparatus comprising in combination a member adapted to be moved along intersecting paths simultaneously; separate means for moving said members along each of said paths; a transmission operating said separate means at a plurality of speeds, but at a constant rate relatively to each other; an attachment adapted to be connected to said transmission; and means within said attachment comprising a gear train adapted selectively to modify the rate of operation of said separate means relatively to each other.

9. A machine tool comprising in combination, a tool-supporting head adapted to be moved simultaneously along intersecting paths; a transmission for simultaneously moving said head along its respective paths at the same rate of speed; an attachment adapted to be connected to said transmission; and means within said attachment including a change-gear train comprising adjustable means for supporting change gears on a plurality of axes, said change-gear train being adapted to modify the rate of movement of said head along either of said intersecting paths relatively to the other.

10. A machine tool comprising in combination, a tool-supporting head adapted simultaneously to be moved along intersecting paths; a transmission for moving said head simultaneously along its respective paths at the same rate of speed; an attachment adapted to be connected to said transmission; and means within said attachment including a change-gear train comprising common fixed axes for supporting change gears that are adapted to cooperate with the transmission to modify the rate of movement of the head along either of its paths relatively to the other thereby to effect movement of said head along a plurality of straight lines within a single plane, said change-gear train also being adapted to control the movement of said head along one of its paths for cutting threads.

11. A machine tool comprising in combination, a tool-supporting head adapted simultaneously to be moved along intersecting paths; a transmission for moving said head simultaneously along its respective paths at the same rate of speed; an attachment adapted to be connected to said transmission including a change-gear train comprising common fixed axes for supporting change gears that cooperate with the transmission to modify the rate of movement of said head along either of its paths relatively to the other thereby to effect movement of said head along a plurality of straight lines within a single plane, said change-gear train also being adapted to control the movement of said head along one of its paths for cutting English threads and for producing English drum scoring.

12. A machine tool comprising in combination, a tool-supporting head adapted simultaneously to be moved along intersecting paths; a transmission for moving said head simultaneously along its respective paths at the same rate of speed; an attachment adapted to be connected to said transmission including a change-gear train comprising common fixed axes for supporting change gears that cooperate with the transmission to modify the rate of movement of said head along either of its paths relatively to the other thereby to effect movement of said head along a plurality of straight lines within a single plane, said change-gear train also being adapted to control the movement of said head along one of its paths for cutting English threads, and for producing English drum scoring; and separate axes within said attachment for supporting change gears for controlling the movement of said head along one of its paths for cutting metric threads.

13. A machine tool comprising in combination, a tool-supporting head adapted simultaneously to be moved along intersecting paths; a transmission for moving said head simultaneously along its respective paths at the same rate of speed; an attachment adapted to be connected to said transmission; means within said attachment including a change-gear train comprising common fixed axes for supporting changeable gears that cooperate with the transmission to modify the rate of movement of said head along either of its paths relatively to the other thereby to effect movement of said head along a plurality of straight lines within a single plane, said change-gear train also being adapted to control the movement of said head along one of its paths for cutting English threads and for producing English drum scoring; and separate common axes within said attachment for supporting changeable gears for controlling the movement of said head along one of its paths for cutting metric threads and for producing metric drum scoring.

14. Apparatus comprising in combination, a member adapted to be moved along intersecting paths; a transmission including separate driven shafts; means for operating said separate driven shafts at a plurality of speeds, but at a constant rate relatively to each other for controlling the movement of said member along each of said paths; and an attachment comprising a unitary structure including means adapted selectively to be connected to either of said driven shafts for modifying the operation thereof independently of the other.

15. Apparatus comprising in combination, a member adapted to be moved along intersecting paths; a transmission including separate driven shafts adapted to be rotated to effect simultaneous movement of said member along each of said paths at the same rate of speed; and an attachment including reversing drive means adapted selectively to be connected to either of said driven shafts for modifying the rate of rotation thereof independently of each other.

16. Apparatus comprising in combination, a member adapted to be moved along intersecting paths; a transmission adapted to impart a plurality of rotative speeds to separate driven shafts for controlling the movement of said member along each of its intersecting paths; said driven shafts being adapted to be operated simultaneously at said plurality of speeds to move said member along a resultant path at an angle midway of the angle between said intersecting paths; and an attachment connected to said transmission for controlling the rate of rotation of either of said driven shafts independently of the other to thereby vary the angle of said resultant path over which said member is adapted to be moved.

17. Apparatus comprising in combination, a member adapted to be moved along intersecting paths; a transmission adapted to impart a plurality of rotative speeds to separate driven shafts for controlling the movement of said member along each of its intersecting paths; said driven shafts being adapted to be operated simultaneously at said plurality of speeds to move said member along a resultant path at an angle midway of the angle between said intersecting paths; and an attachment connected to said transmission including a reversing mechanism for controlling the rate of rotation in either direction of either of said driven shafts independently of the other to thereby vary the angle of said resultant path over which said member is adapted to be moved.

18. Apparatus comprising in combination, a member adapted to be moved along intersecting paths; a transmission adapted to impart a plurality of rotative speeds to separate driven shafts for controlling the movement of said member along each of its intersecting paths; said driven shafts being adapted to be operated simultaneously at said plurality of speeds to move said member along a resultant path at an angle midway of the angle between said intersecting paths; and an attachment connected to said transmission including a reversing mechanism and a change-gear train for controlling the rate of rotation in either direction of either of said driven shafts independently of the other to thereby vary the angle of said resultant path over which said member is adapted to be moved.

19. Apparatus comprising in combination, a member adapted to be moved along intersecting paths, a transmission adapted to impart a plurality of rotative speeds to separate driven shafts for controlling the movement of said member along each of its intersecting paths; said driven shafts being adapted to be operated simultaneously at said plurality of speeds to move said member along a resultant path at an angle midway of the angle between said intersecting paths; an attachment connected to said transmission including a change-gear train comprising a pivotal arm; means for locking said arm at a plurality of points about its axis, and a plurality of gears of varying size adapted to be mounted on said arm for varying the rate of rotation of either of said driven shafts, independently of the other.

20. Apparatus comprising in combination, a member adapted to be moved along intersecting paths; a transmission adapted to impart a plurality of rotative speeds to separate driven shafts for controlling the movement of said member along each of its intersecting paths; and an attachment connected to said transmission including a change-gear train comprising a pivotal arm having adjustable means for providing a plurality of axes on which change gears may be mounted for varying the rate of rotation of either of said driven shafts independently of the other.

21. Apparatus comprising in combination, a member adapted to be moved simultaneously along intersecting paths; a transmission adapted to impart a plurality of rotative speeds to separate driven shafts for controlling the movement of said member along each of its intersecting paths independently, and simultaneously along said paths at the same rate of speed; an attachment connected to said transmission including separate driving shafts connected to said driven shafts; variable-speed gearing between said driving shafts and said transmission; and manually-operable clutches for selectively connecting said driving shafts to said variable-speed gearing, whereby said member may be moved simultaneously along each of said paths at different rates of speed.

22. Apparatus comprising in combination, a member adapted to be moved along intersecting paths; a transmission comprising separate driven shafts adapted to control the movement of said member along each of said paths; means within said transmission for driving said driven shafts in either direction at a plurality of relatively slow speeds and at a substantially constant relatively rapid speed; an attachment connected to said transmission for modifying the movement of said driven shafts relative to said transmission including variable-speed gearing adapted selectively to be connected to either of said driven shafts; means for driving said variable-speed gearing by said transmission; means for rendering the variable-speed gearing of said attachment ineffective when it is desired to control either of said driven shafts by said transmission; and means to render the drive between said transmission and said driven shafts ineffective when it is desired to control said driven shafts through said attachment.

23. Apparatus comprising in combination, a member adapted to be moved along intersecting paths; a transmission comprising separate driven shafts adapted to control the movement of said member along each of said paths; means within said transmission for driving said driven shafts in either direction at a plurality of relatively slow speeds and at a substantially constant relatively rapid speed; an attachment connected to said transmission for modifying the movement of said driven shafts relative to said transmission including variable-speed gearing adapted selectively to be connected to either of said driven shafts; means for driving said variable-speed gearing by said transmission; means for rendering the variable-speed gearing of said attachment ineffective when it is desired to control either of said driven shafts by said transmission comprising manually-operable clutches between said variable-speed gearing and said driven shafts.

24. Apparatus comprising in combination, a member adapted to be moved along intersecting paths; a transmission including means for moving said member independently or simultaneously along said paths at a plurality of relatively slow rates of speed and at a substantially constant relatively rapid speed; speed-reduction gearing for modifying the speed at which said member is moved along said paths; and means adapted to be actuated to prevent the rotation of said speed-reduction gearing when said member is moved along said paths at said relatively rapid speed.

25. Apparatus comprising in combination, a member adapted to be moved along intersecting paths; a transmission including means for moving said member independently or simultaneously along said paths at a plurality of relatively slow rates of speed and at a substantially constant relatively rapid speed; speed-reduction gearing for modifying the speed at which said member is moved along said paths; and means adapted to be actuated to prevent the rotation of said speed-reduction gearing when said member is moved along said paths at said relatively rapid speed comprising manually-operable clutches between said speed-reduction gearing and said member.

26. Apparatus comprising in combination, a member adapted to be moved along intersecting paths; a transmission including means for moving said member independently or simultaneously along said paths at a plurality of relatively slow rates of speed and at a substantially constant relatively rapid speed; a pair of auxiliary driving shafts adapted to be selectively engaged with and disengaged from the means in the transmission that controls the movement of the member along its respective paths; a change-gear train between said auxiliary shafts and said transmission; and a driving connection between said change-gear train and the means in said transmission that moves said member along its respective paths at a plurality of relatively slow rates of speed.

27. An attachment for a machine tool having a member adapted to be moved along intersecting paths by a transmission comprising in combination, a frame; a plurality of driving shafts journaled in said frame and adapted to be driven by said transmission; a change-gear train independent of said transmission and located between said transmission and said driving shafts; means for selectively connecting said driving shafts with, and for disconnecting said driving shafts from said change-gear train; and a reversing gear for effecting rotation of said driving shafts in either direction.

28. An attachment for a machine tool having a member adapted to be moved along intersecting paths by a transmission comprising in combination, a frame; a plurality of driving shafts journaled in said frame and adapted to be driven by said transmission; a change-gear train comprising a pivotal arm adapted to be locked in a plurality of positions, said change-gear train being independent of said transmission and located between said transmission and said driving shafts; a plurality of gears adapted to be mounted on said arm for cooperation with change-gears adapted to be mounted on a fixed axis; and means on said arm for providing a plurality of axes, whereby a maximum number of gear changes may be made within a minimum of space.

29. An attachment for a machine tool having a member adapted to be moved along intersecting paths by a transmission comprising in combination, a frame; a plurality of driving shafts journaled in said frame and adapted to be driven by said transmission; a change-gear train independent of said transmission and located between said transmission and said driving shafts; manually-operable friction clutches between said driving shafts and said change-gear train; and a reversing gear for effecting rotation of said driving shafts in either direction.

30. An attachment for a machine tool having a member adapted to be moved along intersecting paths by a transmission comprising in combination, a housing; a pair of spaced shafts journaled in said housing and adapted to be driven by said transmission; a change-gear train mounted in said housing including gears fixed to sleeves journaled on said shafts, said change-gear train being independent of said transmission and located between said transmission and said shafts; and manually-operated clutches for selectively connecting said shafts to said sleeves.

31. An attachment for a machine tool having a member adapted to be moved along intersecting paths by a transmission comprising in combination; a housing; a pair of spaced shafts journaled in said housing and adapted to be driven by said transmission; a change-gear train mounted in said housing including non-changeable gears fixed to sleeves journaled on said shafts; a plurality of fixed axes adapted to support a plurality of change gears; an arm pivotally mounted within said housing having adjustable means for providing a plurality of axes adapted to support a plurality of change gears; means for locking said arm in any one of a number of adjusted positions; and means for selectively connecting said shafts to, and for disconnecting said shafts from said gear train.

32. An attachment for a machine tool having a member adapted to be moved along intersecting paths by a transmission comprising in combination a housing; a pair of spaced shafts journaled in said housing and adapted to be driven by said transmission; a change-gear train mounted in said housing including non-changeable gears fixed to sleeves journaled on said shafts; a plurality of fixed axes adapted to support a plurality of change gears; an arm pivotally mounted within said housing having a plurality of fixed axes adapted to support a plurality of change gears; means for locking said arm in any one of a number of adjusted positions; and means for selectively connecting said shafts to, and for disconnecting said shafts from said gear train.

33. An attachment for a machine tool having a member adapted to be moved along intersecting paths by a transmission comprising in combination a housing; a pair of spaced shafts journaled in said housing and adapted to be driven by said transmission; a change-gear train mounted in said housing including non-changeable gears fixed to sleeves journaled on said shafts; a plurality of fixed axes adapted to support a plurality of change gears; an arm pivotally mounted within said housing having a plurality of fixed axes adapted to support a plurality of change gears; means for locking said arm in any one of a number of adjusted positions; means for selectively connecting said shafts to, and for disconnecting said shafts from said gear train; and a reversing mechanism within said housing for effecting rotation of said shafts in either direction.

34. In a machine tool, the combination of a member adapted to be moved along intersecting paths; separate shafts for controlling the movement of said member along said paths; a transmission including means for rotating said separate shafts at a plurality of speeds; an attachment for modifying the speeds of rotation of said separate shafts; and means adapted to drive either of said shafts through said attachment independently of the means in the transmission that rotates said separate shafts.

35. In a machine tool, the combination of a member adapted to be moved along intersecting paths; separate shafts for controlling the movement of said member along said paths; a transmission comprising an auxiliary shaft for each of said separate shafts; oppositely-rotatable means journaled on said auxiliary shafts; means for rotating said oppositely-rotatable means; means for engaging said oppositely rotatable means with and disengaging it from said separate shafts; an attachment for modifying the speed of rotation of said separate shafts including driving means connected to the means that rotates the oppositely-rotatable means, whereby said separate shafts may be driven through said attachment independently of said oppositely-rotatable means.

EDWARD P. BULLARD, III.
FRANK H. MUSSLER.
LEROY E. ALVEY.